April 7, 1970    L. J. GUILBAULT ET AL    3,504,431
METHOD OF MANUFACTURING INSULATED ELECTRICAL MEMBERS
Original Filed Sept. 27, 1966
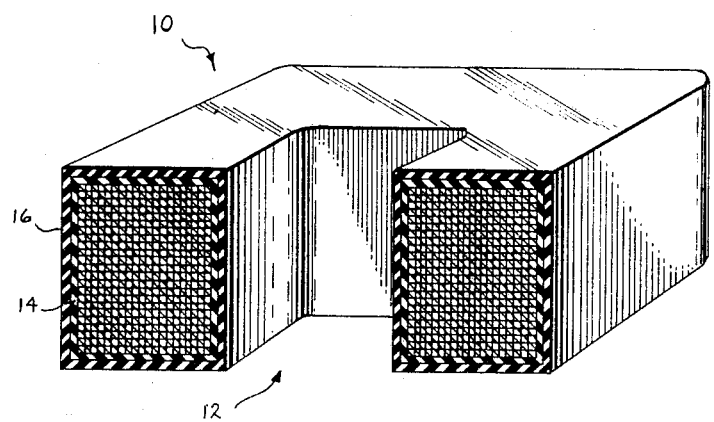
INVENTORS
LAWRENCE J. GUILBAULT
DAVID G. SCHWENKER
BY
THEIR ATTORNEY

United States Patent Office 3,504,431
Patented Apr. 7, 1970

3,504,431
METHOD OF MANUFACTURING INSULATED ELECTRICAL MEMBERS
Lawrence J. Guilbault, Akron, Ohio, and David G. Schwenker, Erie, Pa., assignors to General Electric Company, a corporation of New York
Original application Sept. 27, 1966, Ser. No. 582,277, now Patent No. 3,414,856, dated Dec. 3, 1968. Divided and this application June 11, 1968, Ser. No. 751,639
Int. Cl. H01f 7/06
U.S. Cl. 29—605                                 3 Claims

ABSTRACT OF THE DISCLOSURE

This invention concerns a method for providing a high temperature protective system for an electrical member wherein an encapsulating envelope of epoxy resin is first applied to a electrical member and then a coating of an alkyd material modified with a butylated melamine formaldehyde resin is applied over the epoxy resin envelope.

---

This application is a division of Ser. No. 582,277, filed Sept. 27, 1966, now Patent No. 3,414,856.

This invention relates to an improved insulation system for electric members especially an insulation system for encapsulating electrical members such as soils for dynamoelectric machines and to a method of making such members.

In dynamoelectric machines, one or more of the members may have salient poles of magnetic material thereon with electric coils thereabout so that magnetic flux is produced in the pole when an electric current is caused to flow in the coil. The coil is composed of a plurality of turns of wire which has an electrically insulating coating thereon, usually a suitable electrically insulating enamel, to provide for electrical isolation between the adjacent turns. Wire of this type is often commonly referred to as magnet wire. Magnet wire having insulating enamel coating thereon capable of withstanding continued operating temperatures of at least 135° C. has been available and has been widely used in making coils for dynamoelectric machines. Such improved insulation, for example, allowed higher current densities to be used so that the power output of the dynamoelectric machine could be appreciably increased. One widely used magnet wire of this type, for example, is described in U.S. Patent No. 2,936,296 which is assigned to the same assignee as the present invention. In addition to the foregoing, another very important considerration in electric coils for dynamoelectric machines is the provisions of adequate ground insulation.

For operating temperatures up to about 150° C. adequate ground insulation has heretofore been quite satisfactorily provided by any of a wide variety of insulating materials such as, for example, epoxy or polyester resin compositions. These known materials are not entirely satisfactory, however, for providing the desired ground insulation for apparatus required to operate continuously at temperatures of at least about 180° C. Coils coated with such known materials, for example, are found to exhibit pronounced thermal degradation of the coating composition as well as severe crazing and cracking when the coil is subjected to operating temperatures of about 180° C. for more than short periods. This results in premature failure of machines required to be operated for extended periods at such temperatures. In view of the increasing need to provide electrical apparatus which can operate efficiently and reliably at higher temperatures, for example, 180° C. and above, for extended periods of time, there is a pressing need for an electrical insulation system for electrical members (conductors, coils and the like) having an improved combination of mechanical, electrical and thermal properties. Among these properties, for example, are high dielectric strength, smooth surface to avoid accumulation of dust and other contaminants, resistance to tracking and resistance to thermal degradation.

It is an object of this invention to provide an electrical insulation system, especially suitable for encapsulating electrical members, which exhibits the foregoing desiderata.

It is another object of this invention to provide electrical coils having a ground insulating coating thereabout which is capable of being subjected to elevated temperature for extended periods without impairment of its dielectric strength.

It is another object of this invention to provide insulated electrical members having improved resistance to cracking of the insulation when operated for extended continuous periods at elevated temperatures.

Briefly stated, in accordance with one aspect of the invention, as electrical coil is provided having a plurality of turns of conducting wire the individual turns of which are electrically insulated from each other. A protective coating system surrounds and is bonded to the surface turns of the conducting wire. The protective coating insulation system includes at least one inner layer of a cured electrically insulating epoxy resin composition and at least one outer layer of a cured alkyd material modified with a melamine formaldehyde resin.

Preferably this outer layer is a synthetic polyester resin consisting essentially of the product of reaction obtained by heating a mixture of (1) from about 10.5 to 11.0 parts by weight of a saturated aliphatic polyhydric alcohol, preferably glycerine, having at least three (3) hydroxyl groups, (2) from about 10 to 20 parts by weight of fatty oil having an iodine value of at least about 100, (3) from about 17.6 to 18.8 parts by weight of isophthalic acid, and (4) from about 5 to 15 parts by weight of melamine formaldehyde resin, preferably butylated melamine formaldehyde resin.

The novel features believed characteristic of the invention are set forth with particularity in the appended claims. The invention itself, however, both as to its organization and method of operation, together with further objects and advantages thereof, may best be understood from a consideration of the following description and the drawing in which the single figure is a perspective view in cross section of a finished coil made in accordance wth the present invention.

Referring to the drawing, there is illustrated a coil 10, which may be a field coil for a dynamoelectric machine. As shown, coil 10 may be formed with a suitable window 12 adapted to be fit about the core of the pole piece (not shown) of a dynamoelectric machine. Coil 10 is made up of a plurality of turns of electric conductor arranged so that each of such turns are electrically isolated from each other. Conveniently, this may be accomplished by winding the coil 10 with a suitably insulated electrical conductor, such as for example, magnet wire of the type described in U.S. Patent No. 2,936,296. It will be understood, of course, that such electrical isolation between individual coil turns may be provided in any other suitable manner.

The coil also includes a protective insulation system in accordance with this invention to form an encapsulating shell or envelope about the coil to provide ground insulation therefor. This insulation system comprises at least one inner layer 14 of a cured, electrically insulating epoxy resin composition bonded to the surface turns of the electrical conductor making up the coil and at least one outer layer 16 of a cured alkyd material modified with melamine formaldehyde resin. The insulation system of this invention comprising these two different coating compositions is found to have a combination of electrical and mechanical properties at temperatures above about 180° C. which are considerably better than that combination of properties of either of the materials themselves. Moreover, the lifetime of the insulation system is also considerably longer at such temperatures than either of the materials themselves.

The material for the outer layer 16 is a synthetic polyester resin consisting essentially of the product of reaction obtained by heating a mixture of (1) from about 10.5 to 11.0 parts by weight of saturated aliphatic polyhydric alcohol, preferably glycerine, having at least three (3) hydroxyl groups.

(2) from about 10 to 20 parts by weight of fatty oil having an iodine value of at least about 100.

(3) from about 17.6 to 18.8 parts by weight of isophthalic acid and, (4) from about 5 to 15 parts by weight of melamine formaldehyde resin, preferably butylated melamine formaldehyde resin.

One particular alkyd material modified with a hutylated melamine foramldehyde resin which combined with the inner coating of epoxy resin material to provide an insulation system exhibiting exceptionally desirable high temperature characteristics had the following proportions of ingredients in parts by weight per hundred and wherein the butylated melamine formaldehyde resin was Resimene 881 manufactured and sold by the Monsanto Company:

| | |
|---|---|
| Soya oil | 17.0 |
| Isophthalic acid | 18.2 |
| Butanol | 4.7 |
| Clycerine | 10.8 |
| Butylated melamine | |
| Formaldehyde resin | 9.6 |

The foregoing coating material for the layer 16 may be formed in any of the well known ways for making alkyd materials and will not be described in detail herein. In reactions of this type, it is sometimes found that sublimation of the lower dialkyl esters of the isophthalic acid begins to occur during the initial heating period, and to avoid this, xylene or some similar solvent material may be added to the reaction mixture to keep the lower dialkyl ester of the isophthalic acid in solution. In the specific material set forth above, for example, about 39.7 parts by weight were added to the reaction mixture. Also, to facilitate the blending of the melamine formaldehyde resin 4.7 parts by weight of butanol were added. The xylene, or other similar solvent material and the butanol take no part in the reaction and are distilled from the reaction mixture during the heating process.

Preferably, the inner layer 14 is a fluidized bed-applied epoxy resin composition. In the fluidized bed process, now well known in the art and described, for example, in U.S. Patent No. 2,844,489, the coating composition in the form of a dry powder, is placed in a fluidized state by means of an upward flow of a gas, such as air. The coil to be coated is preheated to a temperature above the melting temperature of the coating composition and it is then immersed in the fluidized coating composition to be removed therefrom when the desired coating thickness has been obtained. Although the fluidized bed process has certain advantages over other types of coating processes, in that, for example, it is possible to coat articles of irregular and complex shapes quickly and uniformly and with coatings which are substantially thicker than can be obtained by the methods which employ the coating composition in liquid form, coatings of epoxy resin compositions so applied have often had thermal characteristics and thermal lifetimes, especially when subjected to temperatures of about 180° C. and above, inferior to those of the same compositions applied in liquid form. Exceptionally desirable fluidized bed-applied epoxy resin coatings having good impact and dielectric strength and long lifetimes at temperatures up to about 150° C. have been found to craze and crack severely and to exhibit marked deterioration of the coating itself when subjected to a temperature of about 200° C. for only 4 few hundred hours, with a resulting decrease in the dielectric strength of the coating. Coils constructed in accordance with one embodiment of the present invention, however, wherein the insulation system comprised an inert layer of a fluidized bed-applied epoxy resin composition of the foregoing type and having an outer layer 16 of alkyd resin material modified with a butylated melamine formaldehyde resin, were found to possess no noticeable cracks or deterioration after several thousand hours in a 200° C. environment.

The epoxy, or ethoxyline, resins are well known in the art and are sold, for example, under the name EPON by the Shell Chemical Corporation, the name ARALDITE by Ciba Chemical Corporation as EPI-REZ by Jones-Dabney and under the name ERL by Union Carbide Co. Many epoxy resin formulations including one or more pigments, fillers or other additives together with a suitable hardener are known in the art which are suitable for use in forming the inner layer 14. One such suitable formulation in liquid form has the following composition with all quantities given in parts by weight:

| | |
|---|---|
| Araldite #6005 | 100 |
| $BF_3 400$ (hardener) | 3 |
| Silica (200 mesh) | 50 |
| Fumed silica | 4–6 |
| 1/32" milled glass fibers | 7 |
| Polyethylene glycol | 6 |

$BF_3$ 400 is the name of a $BF_3$ mono-ethylamine complex available from the Shell Chemical Corporation.

A material suitable for use in forming the layer 14 by the fluidized-bed process may be obtained from the Insulation Materials Department of the General Electric Company under the designation 882–031. Other similar compositions of epoxy fluid-bed powders are available from various well-known suppliers of thermosetting polymers.

The following examples are given only for purposes of further illustrating and describing the invention and are not to be interpreted as limiting the invention.

EXAMPLE I

A sample of an electrical conductor having the dimensions ½" x ½" x 2½" was preheated to a temperature of about 200° C. and immersed for about 5 seconds in a fluidized bed containing epoxy resin coating composition manufactured and sold by the Insulation Materials Department of General Electric Company under the designation 882–031. The sample was then removed from the fluidized bed and placed in an oven heated to about 200° C. and allowed to remain therein for two hours to effect a cure of the epoxy resin coating composition.

The sample was then removed from the oven, allowed to cool to room temperature and then dipped for about 10 seconds, with agitation of the sample, in a soya oil alkyd material modified with butylated melamine formaldehyde resin solution having the specific ingredients of the reaction mixture in the parts by weight as set out hereinbefore. The sample was then placed in an oven maintained at a temperature of about 180° C. and allowed to remain therein for three hours to effect a cure. After such curing the coated sample, hereinafter referred to as "Sample A" was allowed to cool to room temperatures.

A similarly dimensioned sample hereinafter referred to as "Sample B" was preheated to 200° C. and immersed for five seconds in a fluidized bed containing epoxy resin coating composition 882–031. The sample was removed from the fluidized bed placed in a 200° C. oven for two hours to effect a cure of the epoxy resin composition and there-after removed from the oven and allowed to cool to room temperature.

Both Samples A and B were then placed in an oven maintained at 200° C. and the characteristics of the coatings of the two samples compared during aging at this elevated temperature.

After more than 2000 hours of exposure at 200° C. temperature, the surfaces of the coating on Sample A exhibited only a very slight amount of crazing on the corners whereas Sample B exhibited very severe crazing of the surface of the coating at only about 650 hours of such explosure with such severe cracking as to render it unsatisfactory after less than 1100 hours.

The track resistance of the two samples was determined by the "time to track" method of the liquid-contaminant inclined-plane test designated as ASTM-D-2303-64T. Sample A showed a time to track of about 150 minutes whereas Sample B showed a time to track of only about 25 minutes.

Further, whereas samples in accordance with this invention such as that of Sample A consistently passed a 3,000 volt hi-put test while submerged in water whereas only isolated samples coated as Sample B above were able to do so.

EXAMPLE II

Two coils A and B each having a shape similar to that shown in the drawing are wound in a conventional manner using a polyester enameled magnet wire of the type described in Patent No. 2,936,296. The wound coils are than heated to a temperature of about 200° C. and dipped three times, for periods of about 5 seconds each, into a fluidized bed containing an epoxy resin coating composition manufactured and sold by the Insulation Materials Department of the General Electric Company under the designation 582-031. Both coils A and B are then removed from the fluidized bed and placed in an oven maintained at a temperature of 200° C. and allowed to remain therein for two hours to effect a suitable cure of the epoxy coating thereon. Both coils are then removed from the oven and allowed to cool to room temperature.

Coil A is then dipped in a solution of a soya oil alkyd material modified with a butylated melamine formaldehyde resin prepared from a reaction mixture having the specific proportions hereinbefore set forth. Coil A is then removed from this solution allowed to drain for 1 hour in the air at room temperature and then placed in a 180° C. oven for 3 hours to provide a suitable cure after which it was removed and allowed to cool to room temperature.

Both coils A and B were then placed in a 200° C. oven and the condition of the coatings compared during aging at this elevated temperature.

Again coil A, coated in accordance with this invention, exhibited only very slight crazing of the coating surface after more than 2,000 hours of exposure at 200° C. temperature whereas the coating of coil B was so severely cracked as to be unseatisfactory after less than about 1,100 hours. As with the track resistance tests on Samples A and B in Example I, coil A exhibited a "time to track" of more than 6 times that of coil B. Moreover, whereas coil A retained a smooth glossy appearance at the end of more than 2,300 hours of exposure at 200° C. temperature, coil B appeared significantly dulled from its original appearance. Coils coated in accordance with this invention also consistently passed the 3,000 volt hi-pot test while submerged in water while coils coated only with the epoxy resin layer would not consistently do so.

EXAMPLE III

Two coils "C" and "D" are constructed in the following manner: "Alkanex" magnet wire, which is a polyester resin enameled magnet wire sold by General Electric Company, is precision wound about a winding form to provide coils of the desired shape and number of turns.

As the wire is fed to the winding form a flowable adhesive composition of the type descirbed in U.S. Patent No. 3,038,831 is applied thereto. The adhesive is then suitably cured by connecting the coils to a 500 volt direct current supply for about 4 minutes; sufficient heat being developed to provide the cure from the current flowing in the coil. After the adhesive is cured the coils are removed from the winding form and are self-supporting with the adhesive bonding the individual turns into a unitary structure essentially free of voids or gas pockets. The foregoing is essentially the same procedure as is described in U.S. Patent No. 3,182,383.

The self-supporting, essentially void-free coils are then heated to a temperature of 200° C. and dipped three times, for periods of about 5 seconds each, into a fluidized bed containing an epoxy resin coating composition manufactured and sold by the Insulation Materials Department of the General Electric Company under the designation 882-031. Both coils C and D are than removed from the fluidized bed and placed in an oven maintained at a temperature of 200° C. and allowed to remain therein for two hours to effect a suitable cure of the epoxy coating thereon. Both coils are then removed from the oven and allowed to cool to room temperature.

Coil C is then dipped in a solution of a soya oil alkyd material modified with a putylated melamine formaldehyde resin prepared from a reaction mixture having the specific proportions hereinbefore set forth. Coil C is then removed from this solution allowed to drain for 1 hour in the air at room temperature and then placed in a 180° C. oven for 3 hours to provide a suitable cure after which it was removed and allowed to cool to room temperature.

Both coils C and D were then placed in a 200° C. oven and the condition of the coatings compared during aging at this elevated temperature.

Again coil C, coated in accordance with this invention, exhibited only very slight crazing of the coating surface after more than 2,000 hours of exposure at 200° C. temperature whereas the coating of coil D was so severely cracked as to be unsatisfactory after less than about 1,100 hours. As with the track resistance tests on Samples A and B in Example I, coil C exhibited a "time to track" of more than 6 times that of coil D. Moreover, whereas coil C retained a smooth glossy appearance at the end of more than 2,300 hours of exposure at 200° C. temperature, coil D appeared significantly dulled from its original appearance. Coils coated in accordance with this invention also consistently passed the 3,000 volt hi-pot test while submerged in water while coils coated only with the epoxy resin layer would not consistently do so.

What we claim as new and desire to secure by Letters Patent of the United States is:

1. The method of making an electrical coil comprising the steps of:
   (a) forming an electrical coil of predetermined configuration having a plurality of turns of electrical conductor with each such turn electrically isolated from the other;
   (b) charging a fluidized bed container with an electrically insulating epoxy resin coating composition including an epoxy resin film forming material and a hardener therefor;
   (c) heating said coil to a temperature above the melting temperature of said epoxy resin composition;
   (d) immersing said heated coil into said fluidized bed of epoxy resin coating composition;
   (e) heating said coil after its removal from said fluidized bed for a time and at a temperature sufficient to provide at least a partial cure for the epoxy resin coating thereon;
   (f) applying to said at least partially cured epoxy resin coating at least one layer of a liquid alkyl material modified by a butylated melamine formaldehyde resin; and
   (g) heating said coil for a time and at a temperature sufficient to effect a cure of the coating material thereon.

2. The method as set forth in claim 1 wherein the material applied to said at least partially cured epoxy resin coating consists essentially of the product of reaction obtained by heating a mixture of:
- (1) from about 10.5 to 11.0 parts by weight of a saturated aliphatic polyhydric alcohol having at least three (3) hydroxyl groups,
- (2) from about 10 to 20 parts by weight of fatty oil having an iodine value of at least about 100,
- (3) from about 17.6 to 18.8 parts by weight of isophthalic acid, and
- (4) from about 5 to 15 parts by weight of butylated melamine formaldehyde resin.

3. A method of making an electrical coil adapted for operation at elevated temperatures for extended periods, comprising the steps of:
- (a) winding magnet wire to form a coil having a desired shape and number of turns;
- (b) applying a flowable solventless adhesive resinous composition to said magnet wire while it is being wound to fill all spaces between the individual turns of magnet wire;
- (c) curing said adhesive resinous composition to effect a bond between said individual turns and provide an essentially void-free, self-supporting, unitary coil assembly;
- (d) charging a fluidized bed container with an epoxy resin coating composition which provides when applied and cured an electrically insulating coating;
- (e) heating said coil assembly to a temperature above the melting temperature of said epoxy resin coating composition;
- (f) immersing said heated coil assembly into said fluidized-bed of coating composition for at least one three second period;
- (g) removing said coil assembly with melted epoxy coating composition thereon from said fluidized bed and effecting at least a partial cure of said epoxy resin coating;
- (h) cooling said coil assembly to room temperature;
- (i) applying to said cooled coil assembly an outer coating of a liquid alkyl material which consists essentially of the product of reaction obtained by heating a mixture of;
    - (1) 10.8 parts by weight glycerine;
    - (2) 17.0 parts by weight soya oil;
    - (3) 18.2 parts by weight isophthalic acid and;
    - (4) 9.6 parts by weight butylated melamine formaldehyde resin;
- (j) and heating said coil assembly for a time and at a temperature to effect a full cure of the coating materials applied thereto.

References Cited

UNITED STATES PATENTS

| | | |
|---|---|---|
| 2,983,700 | 5/1961 | Rohm. |
| 3,297,970 | 1/1967 | Jones _____ 336—205 |
| 3,339,162 | 8/1967 | Burnsteel et al. _____ 336—205 |

JOHN F. CAMPBELL, Primary Examiner

C. E. HALL, Assistant Examiner

U.S. Cl. X.R.

29—602; 117—218; 174—120; 336—205

PO-1050
(5/69)

United States Patent Office
CERTIFICATE OF CORRECTION

Patent No. 3,504,431            Dated April 7, 1970

Inventor(s) Lawrence J. Guilbault and David G. Schwenker

It is certified that error appears in the above-identified patent and that said Letters Patent are hereby corrected as shown below:

Column 6, Line 72      Delete "alkyl" and insert therefor -- alkyd --

Column 8, Line 10      Delete "alkyl" and insert therefor -- alkyd --

SIGNED AND SEALED
AUG 25 1970

(SEAL)
Attest:

Edward M. Fletcher, Jr.
Attesting Officer

WILLIAM E. SCHUYLER, JR.
Commissioner of Patents